United States Patent
Erickson et al.

(10) Patent No.: US 7,840,441 B2
(45) Date of Patent: Nov. 23, 2010

(54) METHOD, MEDIUM, AND SYSTEM FOR MANAGING CUSTOMER ORDER ALTERATIONS

(75) Inventors: Steven C. Erickson, Rochester, MN (US); Ivory Wellman Knipfer, Rochester, MN (US); Fraser Allan Syme, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 11/425,833

(22) Filed: Jun. 22, 2006

(65) Prior Publication Data

US 2007/0299730 A1 Dec. 27, 2007

(51) Int. Cl.
*G06Q 30/00* (2006.01)
*G06F 17/30* (2006.01)

(52) U.S. Cl. .............................. 705/26; 705/27; 705/28; 700/95; 700/115

(58) Field of Classification Search ............. 705/26–28; 700/95–107, 115–120
See application file for complete search history.

(56) References Cited

U.S. PATENT DOCUMENTS

| 5,819,232 | A |   | 10/1998 | Shipman |         |
|-----------|---|---|---------|---------|---------|
| 6,003,012 | A | * | 12/1999 | Nick    | 705/10  |
| 6,009,406 | A | * | 12/1999 | Nick    | 705/10  |
| 6,167,383 | A | * | 12/2000 | Henson  | 705/26  |
| 7,079,910 | B1| * | 7/2006  | McDavitt et al. | 700/107 |
| 7,340,416 | B1| * | 3/2008  | Larabee et al. | 705/26 |
| 2004/0153187 | A1 | | 8/2004 | Knight et al. | |
| 2007/0143124 | A1 | * | 6/2007 | Blouin et al. | 705/1 |

OTHER PUBLICATIONS

"Official Announcement of hte Release of Our New and Improved Site". Nov. 8, 2003. [recovered from www.realdoll.com/news on Mar. 23, 2010].*

* cited by examiner

*Primary Examiner*—William J Allen
(74) *Attorney, Agent, or Firm*—Yee & Associates, P.C.; Steven L. Bennett

(57) ABSTRACT

A method for managing customer order alterations in a manufacturing environment is provided. A new order that comprises a new product configuration is received. The new product configuration is a modified version of an original product configuration in an existing order. A first score for a first option for building the new product configuration from scratch is determined. A second score for a second option for modifying the existing product configuration to satisfy the new product configuration is determined. A best option is determined by comparing the first and second scores and selecting an option with a lower score. The best option is presented to a user. In another exemplary embodiment additional scores for additional options for building the new product configuration from other products in existing inventory are determined. The best option is then determined by comparing all scores and selecting an option with a lower score.

20 Claims, 6 Drawing Sheets

| 404 | 406 | 408 | 410 | 412 | |
|---|---|---|---|---|---|
| PART NUMBER | ASSEMBLY TYPE | ... | ADD CODE | REMOVE CODE | PART ATTRIBUTE TABLE 402 |
| 12345 | PRODUCT A | ... | A1 | R1 | |
| 12345 | PRODUCT B | ... | A2 | R1 | |

| 422 | 424 | 426 | |
|---|---|---|---|
| WEIGHT CODE | VALUE | DESCRIPTION | |
| A1 | 5 | PCI CARD STANDARD INSTALL | |
| A2 | 10 | REMOVEABLE MEDIA STANDARD INSTALL | |
| R1 | 12 | PCI OR REMOVABLE MEDIA REMOVAL | 420 WEIGHTING TABLE |
| EA1 | 5 | ADDING ENCLOSURE TO RACK | |
| ER2 | 10 | REMOVE ENCLOSURE FROM RACK | |

MODIFY EXISTING SCORECARD 540

| PART | ACTION | QUANTITY | WEIGHT CODE | WEIGHT VALUE |
|---|---|---|---|---|
| SCSI | REMOVE | 1 | R1 | 12 |
| POWER FILLER | REMOVE | 1 | PR1 | 3 |
| POWER SUPPLY | ADD | 1 | PS1 | 4 |
| FC | ADD | 1 | A2 | 10 |
| RAID | ADD | 1 | A2 | 10 |
| TOTAL | | | | 39 |

542 544 546 548 550

552

BETTER TO MODIFY THAN TO BUILD FROM SCRATCH

BUILD FROM SCRATCH SCORECARD 560

| PART | ACTION | QUANTITY | WEIGHT CODE | WEIGHT VALUE |
|---|---|---|---|---|
| SCSI | ADD | 1 | A1 | 5 |
| ETHERNET | ADD | 2 | A1 | 10 |
| POWER SUPPLY | ADD | 2 | PS1 | 8 |
| FC | ADD | 1 | A2 | 10 |
| RAID | ADD | 1 | A2 | 10 |
| TOTAL | | | | 43 |

562 564 566 568 570

572

BETTER TO MODIFY THAN TO BUILD FROM SCRATCH

*FIG. 5B*

METHOD, MEDIUM, AND SYSTEM FOR MANAGING CUSTOMER ORDER ALTERATIONS

BACKGROUND OF THE INVENTION

1. Field of the Invention

The present invention relates generally to a data processing system. More specifically, the present invention relates to a computer implemented method, apparatus, and computer program product for managing customer order alterations in a manufacturing environment.

2. Description of the Related Art

Today, customers that buy highly-configurable products may need to make order changes late in the ordering process. Often these changes are requested after production has started on the order. This is referred to as "order alteration". These complex product configurations can be made up of many custom-built assemblies, hundreds or thousands of parts and may include specific software or customization services as well. An assembly is an item forming a portion of a product that can be provisioned and replaced as an entity and which normally incorporates replaceable parts or groups of parts.

While alterations are usually customer-driven, they can actually originate from both the customer and the company supplying the product. Customer alterations are the most frequent where the ordered product configuration is changed in some way, either hardware, software, or customization specification, from the original order submitted. A customization specification is a special customer specific modification to either hardware or software. For example, painting a customer logo on a product is a customization specification. Other order changes can be driven by the company building the product, such as, for example, in order to avoid delays due to a constrained part or to request a change to fix an incompatibility in the original configuration, or because the sales team made a mistake in translating the customer requirements into an order, and so forth.

Manufacturing applications and tools that support the integration of highly-configurable products, need to have the ability to handle late changes in the most efficient way possible. Simply canceling the order each time and starting over, which is common practice, may not be ideal because of the extra manufacturing time/cost required as well as longer cycle time for the customer shipment. But, in the case of a significant change in the configuration, rebuilding all or part of the product may be more efficient and involve less work than modifying the existing order to match the new configuration. The ability to "weigh" the alternatives and provide the optimum work direction to manufacturing optimizes this process without requiring manual assessment which may be based on an instinct and gut feel that may not be correct. Weighing is the process of assigning a value or cost to performing a particular action for a particular part. A weight is the value assigned to a particular part for a particular action. For example, a logic card may have a weight of five for adding the logic card to a new assembly and a weight of three for removing the logic card from an assembly.

Companies today can handle simple alterations with existing control systems, but cannot automatically handle more complex alterations without starting a new order and manually "mining" the previously-built configuration when building the new one. Mining refers to a manual process of taking parts from the previous work in progress when building the new one. If customers cannot be charged for the additional work, this can affect the profitability of the sales transaction or cause a delay that results in a cancelled order.

With companies moving increasingly complex manufacturing operations to lower-cost geographies, making decisions on how to handle dynamic changes can no longer depend on skills and experience of certain key employees in the manufacturing organization. A supplier that can automatically choose the best course of action to respond to a change request will be able to ship the desired product faster, with less direct labor and inventory costs, which improves customer satisfaction and profitability.

BRIEF SUMMARY OF THE INVENTION

Exemplary embodiments describe a computer implemented method, a computer program product and a data processing system for managing customer order alterations in a manufacturing environment. A new order that comprises a new product configuration is received. The new product configuration is a modified version of an original product configuration in an existing order. A first score for a first option for building the new product configuration from scratch is determined. A second score for a second option for modifying the existing product configuration to satisfy the new product configuration is determined. A best option is determined by comparing the first and second scores and selecting an option with a lower score. The best option is presented to a user.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 5B is a block figure depicting altering an order in accordance with an exemplary embodiment;

DETAILED DESCRIPTION OF THE INVENTION

Figure 1:
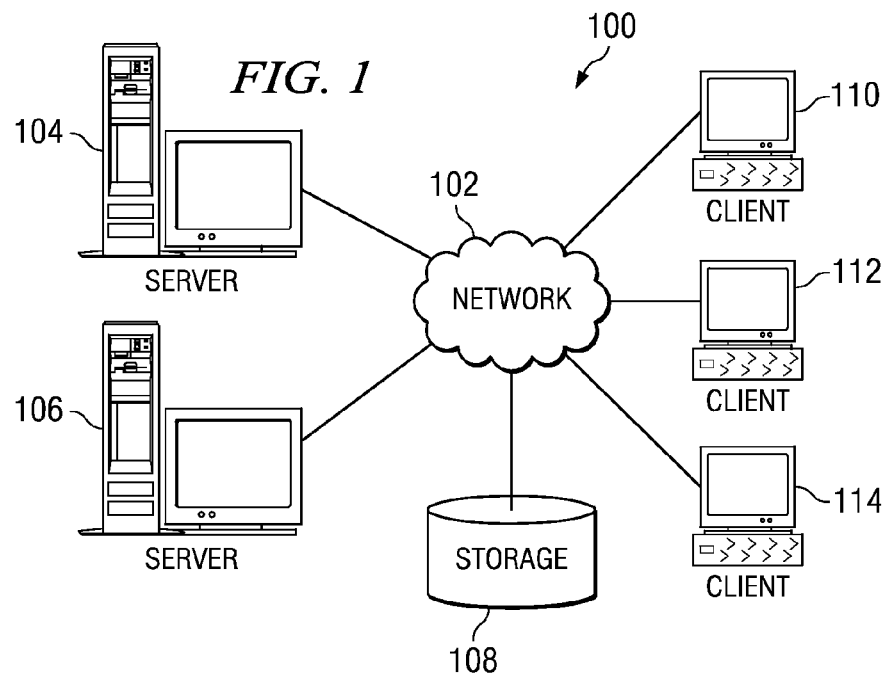
FIG. 1 is a pictorial representation of a network of data processing systems in which exemplary aspects may be implemented.
Figure 2:
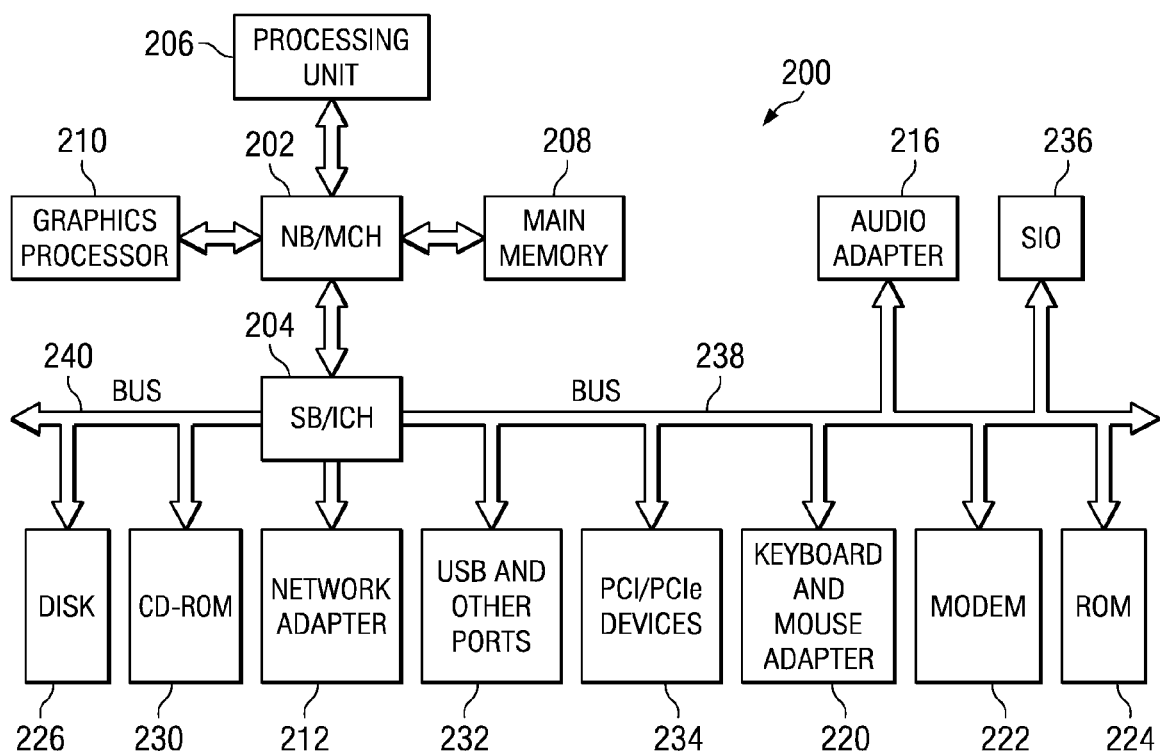
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments redesign the alteration logic for supply chain (SC) fulfillment models by adding the capability to "calculate and weigh" reconfiguration options "automatically", taking into account various situational factors. One factor to be considered is an awareness of where the order is within the order fulfillment process and therefore what investment of labor and parts has already been made. Another factor to be considered is an awareness of other custom-built inventory from shipped and uninstalled (S&U) and/or canceled orders. Shipped and uninstalled inventory is product that has been built, shipped, and returned, unopened and unused, in new condition. Cancelled inventory is inventory that has not been shipped. Exemplary embodiments add the capability to detect Capacity upgrade On Demand alterations. Capacity upgrade On Demand (CuOD) refers to the activation of resources such as processor, memory, and so forth, based on what the customer has paid for versus what is physically installed. For example, two systems may ship with the same parts installed, but with two different levels of performance based on the entitled resources of the customer. Manufacturing generates and installs encryption keys to control this.

Another exemplary embodiment adds the capability to detect logical partitions (LPAR)/customer specified partitions (CSP) alterations. Customer specified partitions refer to a special customer placement of parts. For example, a customer may dictate how the customer wants the product assembled and can change this assembly even though the ordered parts do not change. Exemplary embodiments add the capability to re-utilize existing assemblies in any location as another option for a new starting point in addition to the options of using the existing assemblies or starting from scratch. Assemblies are a subsystem of the product configuration. In car manufacturing, assemblies could be the engine, the transmission, the chassis, the body, the instrument cluster, and so forth. Assemblies may be built by separate people and then merged into the final product configuration.

Exemplary embodiments add the capability to assess the time required for each assembly altered. In an exemplary embodiment, the various factors and capabilities listed above are controlled through tables inside the control system. A control system is typically what is referred to as a Manufacturing Execution System (MES), which can also be called a Manufacturing Floor Control System.

The control system will determine the steps required to build the new product configuration from scratch as well as the work required to start from the partially-built original product configuration. A "weighting logic" is applied to compare a build-from-scratch option versus a modify previous work in progress option. A total score is then arrived at for both options. The scores are compared. The lowest score is deemed the best option. In an exemplary embodiment, the control system presents the user with the options for managing the alteration of each assembly. In another embodiment, the control system dictates the method to be used to get each assembly to the new desired product configuration.

In one exemplary embodiment the control system calculates a third option, that is the option to use other available assemblies, such as shipped and unused inventory or cancelled inventory, as starting points for the new product configuration if altering these assemblies to become the new product configuration would derive a lower score than altering the old product configuration or building the new product configuration from scratch.

The redesigned alteration logic enables a fulfillment business to process all aspects of a customer order alteration: hardware, software, on-demand resource activations, LPAR definition, customization, and so forth, while giving the business the flexibility to assess the impact of the order alteration to the processes and delivery schedule. The redesigned alteration logic results in a reduction in resources in the area of tear downs versus a cancel and start over approach and a reduced cycle time for orders that can reuse in-process cancelled orders. The redesigned alteration logic reduces inventory due to the immediate reapplication of the torn down components.

The quality of product is improved due to reduced handling. The redesigned alteration logic yields a more responsive business.

Exemplary embodiments provide the control system the ability to calculate and weigh the labor required for each assembly of the new desired product configuration to be built either by starting from scratch, modifying the original product configuration, or by modifying existing cancelled or returned assemblies. All part numbers are assigned a weight code for adding and for removing the part when the parts are released to manufacturing as an orderable part. This is a one-time process for most parts. When a single part number requires multiple weighting values, then the type of assembly the part number can be assembled into may be used as an additional key into the weighting table. For example, a logic card may plug easily into a single planar for one product, but in another product the logic card is required to be part of an assembly that needs to be removed and reinstalled in order to attach the logic card. Thus, in the latter case, the part should have a higher weight to reflect the additional effort required when this part needs to be added or removed. It is also possible to assign "infinite" weights to any disassembly steps that are not feasible due to plug limitations, etc. In addition, weights can be assigned as "base" to the start from scratch scenario, to represent base setup costs such as preparing raw metal, applying labels or screws, and so forth. Weights can also be assigned to the tear down if the overall labor costs are the critical criteria as opposed to cycle time.

The control system will perform three calculations for each assembly. The first calculation is the weight or cost of installing everything from scratch in the new product configuration. The second calculation is the total weight or cost of removing parts from the original work in progress that are not in the new product configuration, adding parts needed in the new product configuration and moving the removed and added parts to meet the new customer requirements. The third calculation would be to assess any assemblies available in cancelled/returned product that are modifiable more easily into the new product configurations.

Based on these three calculations, the control system can then adjust the production status of the customer order to direct the best course of action automatically for each assembly. It is also possible to have the control system present all the options and allow for human, a user, override as well.

Figures 3, 4:
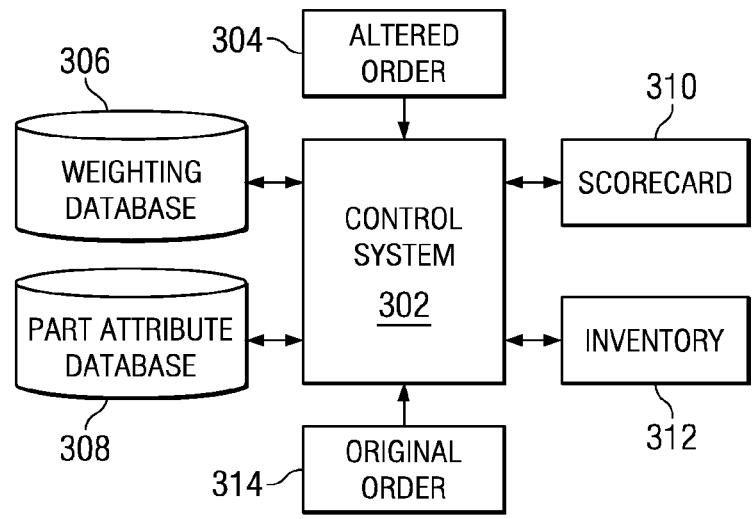
FIG. 3 is a block diagram for managing customer order alterations in a manufacturing environment in accordance with exemplary embodiments.
FIG. 4 is an example of a part attribute table and a weighting table in accordance with an exemplary embodiment.

FIG. 3 is a block diagram for managing customer order alterations in a manufacturing environment in accordance with exemplary embodiments. A manufacturing environment refers to any situation where customer requirements are received and translated into instructions/processes for combining raw materials or purchased components, which could be hardware or software, together into a desired resulting product. Special customization instructions may also be present in such an environment.

Control system 302, which may be implemented as a data processing system, such as data processing system 200 in FIG. 2, receives altered order 304 and original order 314. In the present example control system 302 is depicted at a manufacturing site; however, the location of control system 302 is transparent to the manufacturing site and control system 302 could be located at a remote location to the manufacturing site. Altered order 304 comprises a new product configuration which modifies an original product configuration contained in original order 314. Control system 302 then checks inventory 312 to see if any products for original order 314 have begun to be built. Control system 302 determines options for fulfilling altered order 304. Control system 302 then queries part attribute data base 308 and weighting database 306 to determine weights for each part to be used in any option. These weights are entered into scorecard 310 for each option. A total score or weight is determined for each option and a best option is determined.

FIG. 4 is an example of a part attribute table and a weighting table in accordance with an exemplary embodiment. In an exemplary embodiment, Part Attribute Table 402 comprises five columns: part number 404, assembly type 406, column 408, add code 410 and remove code 412. Column 408 is untitled in the present example. Column 408 represents the fact that attribute table 402 could be expanded to include any number of additional fields. Part number 404 contains the part number of the individual part. Assembly type 406 lists the particular type of assembly that the part is to be built into. An assembly type describes the specific type of assembly involved. Add code 410 contains a code to be looked up in weighting table 420 when the specific part is to be added to a product. Remove code 412 contains a code to be looked up in weighting table 420 when the specific part is to be removed from a product.

Weighting table 420 comprises three columns: weight code 422, value 424, and description 426. Weight code 422 contains the codes from add code 410 and remove code 412. Value 424 is a point value associated with each particular weight code. Description 426 is a written description of what is actually being done to the particular part. For example, part number 12345 goes into assembly type product A and has an add code of µl and a remove code R1. Looking up code A1 in Weight Table 420, weight code A1 has a value of 5 and is described as a PCI card standard install.

In an exemplary embodiment a weighting table could also be indexed by other factors. For example, weighting table 420 may be indexed according to direct labor hours, or for scrap cost, and so forth. These additional attributes could be used in determining the best option. The normal weighting logic would be figured, but, for example, a scrap cutoff of $100 may exist that causes the option with lower scrap total to be used even though the chosen option has a higher score than the other options.

Figure 5A:
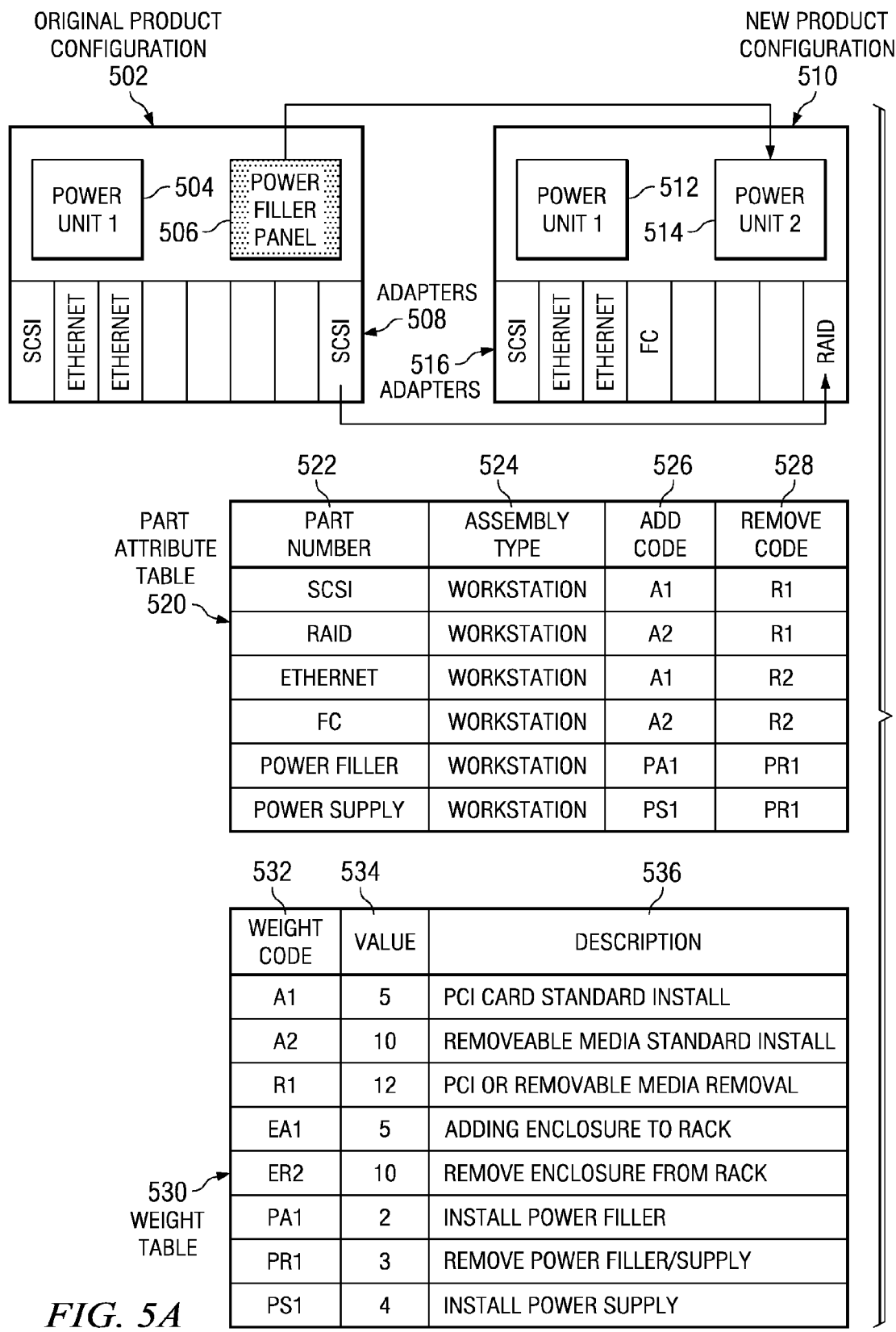

FIGS. 5A and 5B is a block figure depicting altering an order in accordance with an exemplary embodiment. Original product configuration 502 comprises power unit 1 504, power filler panel 506, and adapters 508. Adapters 508 has eight slots. From left to right the slots are a SCSI adapter, an Ethernet adapter, a second Ethernet adapter, four blank slots, and a second SCSI adapter. Original product configuration 502 is modified to form new product configuration 510 by adding a second power unit in place of the power filler panel, replacing one of the SCSI adapters with a RAID adapter, and a fiber channel (FC) adapter is added. Thus, new product configuration 510 comprises power unit 1 512, power unit 2 514, adapters 516. Adapters 516 has eight slots. From left to right the slots are an SCSI adapter, an Ethernet adapter, a second Ethernet adapter, a fiber channel (FC) adapter, three blank slots, and a RAID adapter.

Part Attribute Table 520 comprises four columns: part number 522, assembly type 524, add code 526 and remove code 528. Part number 522 contains the part number of the individual parts in original product configuration 502 and new product configuration 510: SCSI adapter, RAID adapter, Ethernet adapter, fiber channel (FC) adapter, power filler, and power supply. Assembly type 524 lists the particular type of assembly that the part is to be built into. In the present example, all the parts are built in a workstation assembly. Add code 526 contains a code to be looked up in weighting table 530 when the specific part is to be added to a product. Remove code 528 contains a code to be looked up in weighting table 530 when the specific part is to be removed from a product.

Weighting table 530 comprises three columns: weight code 532, value 534, and description 536. Weight code 532 contains the codes from add code 526 and remove code 528. Value 534 is a point value associated with each particular weight code. Description 536 is a written description of what is actually being done to the particular part. In order to calculate the costs of the options for modifying existing original product configuration 502 into new product configuration 510 as compared to building new product configuration 510 from scratch, the part is looked up in part attribute table 520. The add or remove code is obtained from part attribute table 520 and looked up in weighting table 530. This information is placed into the scorecard for the appropriate option and a total for each option is reached.

Modifying existing scorecard 540 comprises columns part 542, action 544, quantity 546, weight code 548, weight value 550, as well as the row, total 552. Column 542 shows the parts involved in modifying original product configuration 502 into new product configuration 510. The parts are SCSI, power filler, power supply, fiber channel (FC), and RAID. For any individual part, the value for the weight code in weight code 548 is multiplied by the quantity in quantity 546 and this value is placed into weight value 550. The value for weight code 548 is determined by looking up the code in weight table 530 and obtaining the corresponding value from value 534. The total for all weight values in weight value 550 is 39, as seen in row total 552.

Building from scratch scorecard 560 comprises columns part 562, action 564, quantity 566, weight code 568, weight value 570, as well as the row, total 572. Column 562 shows the parts involved in building new product configuration 510 from scratch. The parts are SCSI, Ethernet, power supply, fiber channel (FC), and RAID. For any individual part, the value for the weight code in weight code 568 is multiplied by the quantity in quantity 566 and this value is placed into weight value 570. The value for weigh code 568 is determined by looking up the code in weight table 530 and obtaining the corresponding value from value 534. For example, Ethernet has a quantity of two and a value of five. These two numbers are multiplied together and the result, ten is placed into column weight value 570. The total for all weight values in weight value 570 is 43, as seen in row total 572. Thus comparing the score for building from scratch, 43, to the score modifying the existing product, 39, it can be seen that modifying the existing product is the better, cheaper solution.

Figure 6:
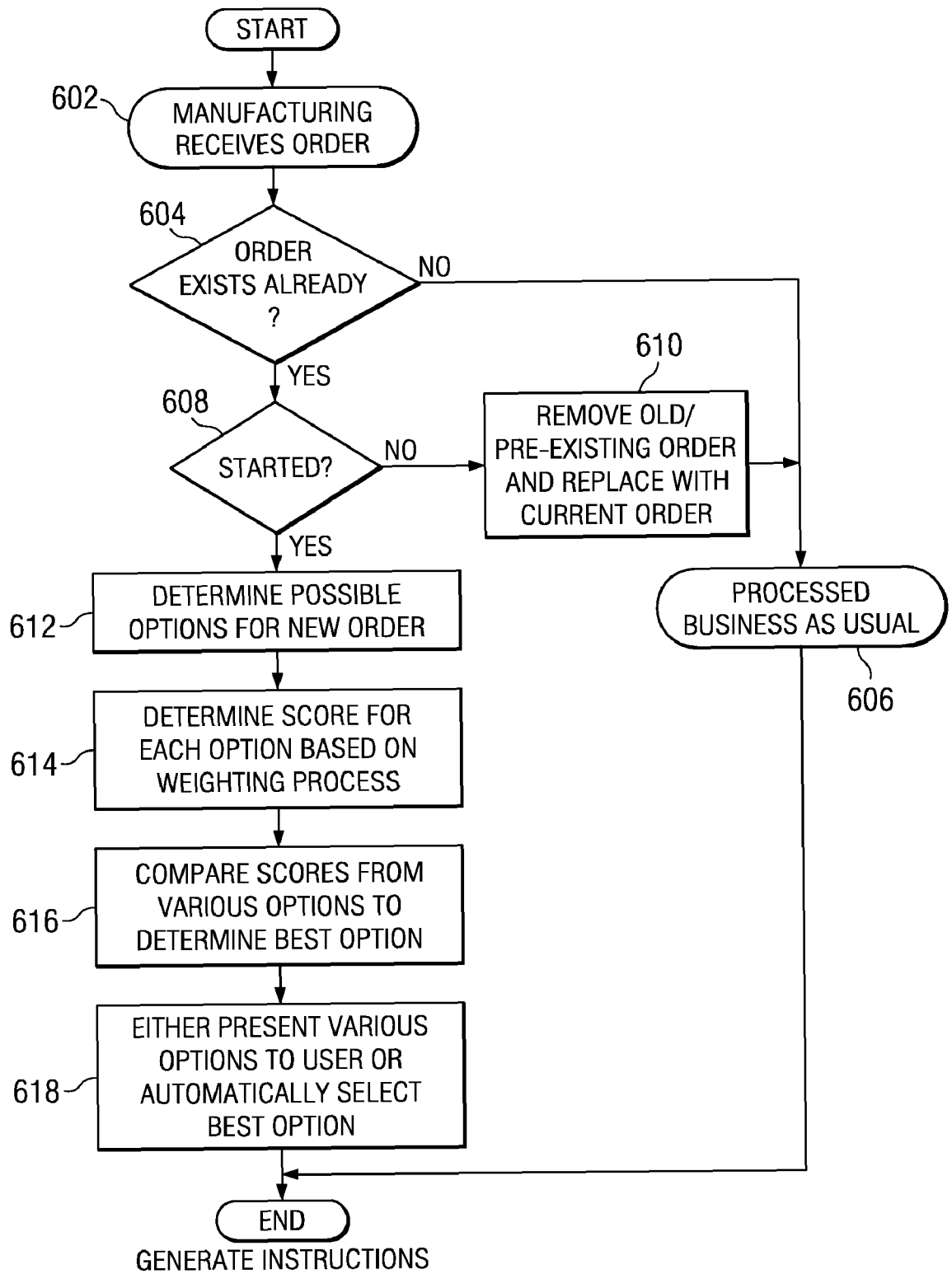
FIG. 6 is a flowchart illustrating the operation of managing customer order alterations in accordance with exemplary embodiments.

FIG. 6 is a flowchart illustrating the operation of managing customer order alterations in accordance with exemplary embodiments. The operation begins when manufacturing receives an order (step 602). The operation determines if the order already exists (step 604). If the order does not already exist (a no output to step 604), the order is then processed business as usual, as there is nothing to modify (step 606) and the operation ends.

If the order does already exist (a yes output to step 604), the operation determines if production on the order has started (step 608). If production on the order has not already started (a no output to step 608), the old, pre-existing order is removed and replaced with the current order (step 610). The order is then processed business as usual, as there is nothing to modify (step 606) and the operation ends.

If production on the order has already started (a yes output to step 608), the operation determines possible options for the new order (step 612). A score is determined for each option based on a weighting process (step 614). The operation compares the scores from the various options to determine a best option (step 616). Depending upon the implementation, the operation either presents the various options to the user for the user to choose or automatically selects the best option and proceeds based on that option (step 618) and the operation ends.

In an exemplary embodiment, existing inventory is also taken into consideration when determining a best option. For example, if a customized part was needed for the new configuration but the part only currently existed in inventory in a normal, non-customized form, the cost of customizing the part would also be included in calculation of the weight of the various options available to the control system.

In another exemplary embodiment the control system takes inventory constraints into consideration and may choose multiple best fit options. For example, the control system may decide that modifying a particular product that is in current inventory to become the new product configuration is more effective than building the product configuration from scratch. However, there may not be enough of that particular product in current inventory to cover all the products in the new product configuration. Therefore, the control system would issue instructions for modifying the existing inventory while also issuing instructions for building part of the order from scratch.

Figure 7:
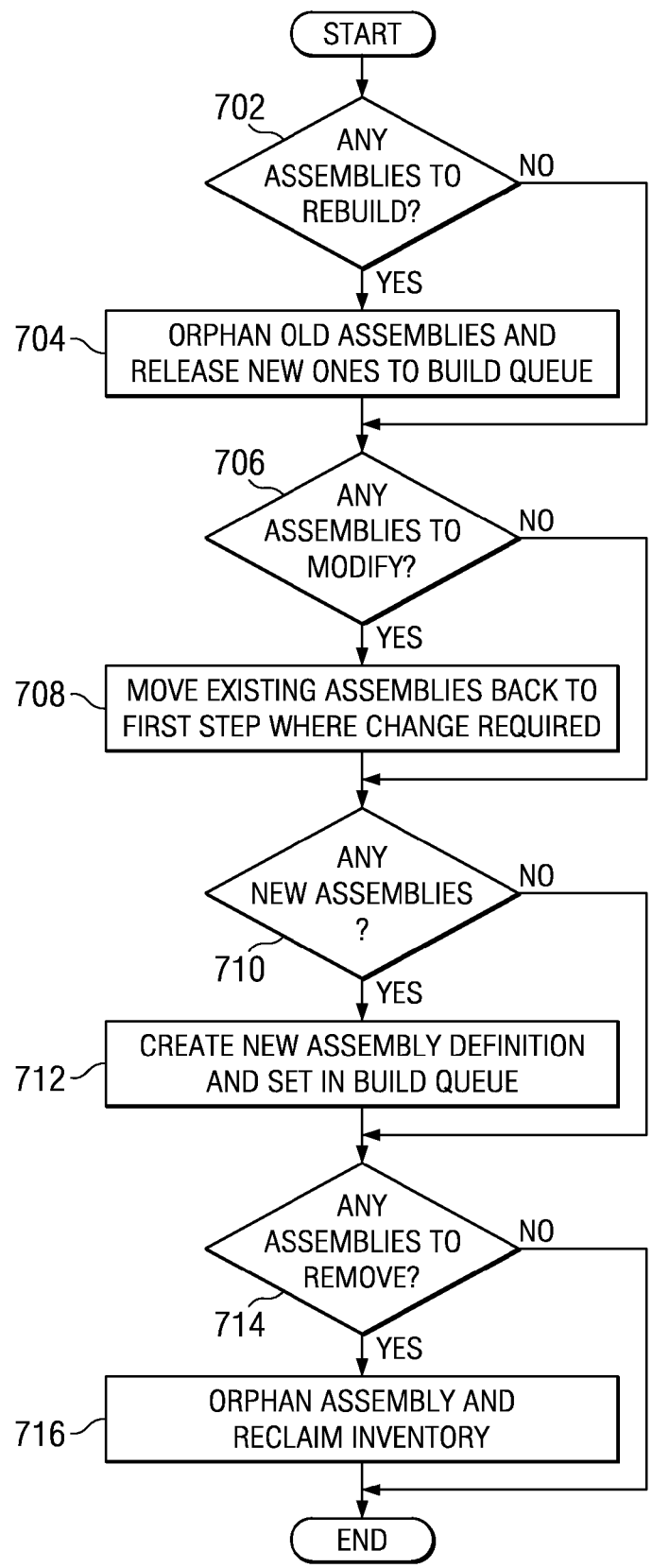
FIG. 7 is a flowchart illustrating modifying an existing product into a new configuration in accordance with an exemplary embodiment.

FIG. 7 is a flowchart illustrating modifying an existing product into a new configuration in accordance with an exemplary embodiment. FIG. 7 shows an example of how the solution arrived at in step 618 of FIG. 6 might be executed. The operation begins by determining if there any assemblies to rebuild (step 702). Rebuilding means to build a new assembly from scratch and return the original assembly to stock to be torn down or used for new orders. If there are any assemblies to rebuild (a yes output to step 702), the operation orphans the old assemblies and releases new assemblies to the build queue (step 704). Then the operation determines if there are any assemblies to modify (step 706). If there are not any assemblies to be rebuild (a no output to step 702), the operation determines if there are any assemblies to modify (step 706). Modifying means to add or remove content from the existing assembly to match the new customer specification. Any removed parts are returned to stock. If there are complete assemblies that are no longer needed, they are returned to inventory and optionally torn down.

If there are any assemblies to modify (a yes output to step 706), the operation moves existing assemblies back in the production process to the first step in which a change is required (step 708). Then the operation determines if there are any new assemblies (step 710). If there are not any assemblies to modify (a no output to step 706), the operation determines if there are any new assemblies (step 710).

If there are any new assemblies (a yes output to step 710), the operation creates a new assembly definition and puts the new assembly in a build queue (step 712). Typically, new assemblies will be placed towards the beginning of the build queue. Then the operation determines if there are any assemblies to remove (step 714). If there are not any new assemblies (a no output to step 710), the operation determines if there are any assemblies to remove (step 714).

If there are any assemblies to remove (a yes output to step 714), the operation orphans the removed assemblies and reclaims the removed assemblies to inventory (step 716) and the operation ends. If there are not any assemblies to remove (a no output to step 714), the operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing customer order alterations in a manufacturing environment, the computer implemented method comprising:
   receiving a new order that comprises a new product configuration, wherein the new product configuration is a modified version of an original product configuration in an existing order;
   determining whether production of the original product configuration for the existing order has started;
   responsive to determining that production of the original product configuration for the existing order has started, determining a number of parts that would need to be added to a current build of the original product configuration and a number of parts that would need to be removed from the current build of the original product configuration to produce the new product configuration;
   determining a first score for a first option for building the new product configuration from scratch, wherein the first score includes a weight for each part in the new product configuration to be added to build the new product configuration from scratch;

determining a second score for a second option for modifying the original product configuration to satisfy the new product configuration, wherein the second score includes a weight for each part in the number of parts that would need to be added to the current build of the original product configuration and a weight for each part in the number of parts that would need to be removed from the current build of the original product configuration;

determining, by a processing unit, a best option by comparing the first and second scores and selecting an option with a lower score; and presenting the best option to a user.

2. The computer implemented method of claim 1, further comprising;

executing the best option.

3. The computer implemented method of claim 1, further comprising;

determining at least a third score for at least a third option for building the new product configuration from other products in existing inventory, wherein the third score includes a weight for the other products in existing inventory needed to build the new configuration, a weight for each part that would need to be removed from the other products to build the new configuration, and a weight for each part that would need to be added to the other products to build the new configuration; and determining the best option by comparing the first, second, and third scores and selecting an option with a lower score.

4. The computer implemented method of claim 1, wherein the new product configuration and the original product configuration each comprise at least one assembly.

5. The computer implemented method of claim 4, wherein the first and second scores are based on a weight for each part in the at least one assembly.

6. The computer implemented method of claim 5, wherein the weight for each part in the at least one assembly is based on an amount of time to alter the at least one assembly.

7. The computer implemented method of claim 5, wherein the weight for each part in the at least one assembly is based on a cost to alter the at least one assembly.

8. The computer implemented method of claim 1, wherein the new product configuration comprises at least one of a logical partition, a customer specified partition, and a capacitance upgrade on demand.

9. A computer program product comprising a computer readable storage medium including computer usable program code for managing customer order alterations in a manufacturing environment, the computer-program product comprising:

computer usable program code for receiving a new order that comprises a new product configuration, wherein the new product configuration is a modified version of an original product configuration in an existing order;

computer usable program code for determining whether production of the original product configuration for the existing order has started;

computer usable program code for, determining a number of parts that would need to be added to a current build of the original product configuration and a number of parts that would need to be removed from the current build of the original product configuration to produce the new product configuration in response to determining that production of the original product configuration for the existing order has started;

computer usable program code for determining a first score for a first option for building the new product configuration from scratch, wherein the first score includes a weight for each part in the new product configuration to be added to build the new product configuration from scratch;

computer usable program code for determining a second score for a second option for modifying the original product configuration to satisfy the new product configuration;

computer usable program code for determining a best option by comparing the first and second scores and selecting an option with a lower score, wherein the second score includes a weight for each part in the number of parts that would need to be added to the current build of the original product configuration and a weight for each part in the number of parts that would need to be removed from the current build of the original product configuration; and computer usable program code for presenting the best option to a user.

10. The computer program product of claim 9, further comprising;

computer usable program code for executing the best option.

11. The computer program product of claim 9, further comprising;

computer usable program code for determining at least a third score for at least a third option for building the new product configuration from other products in existing inventory, wherein the third score includes a weight for the other products in existing inventory needed to build the new configuration, a weight for each part that would need to be removed from the other products to build the new configuration, and a weight for each part that would need to be added to the other products to build the new configuration; and computer usable program code for determining the best option by comparing the first, second, and third scores and selecting an option with a lower score.

12. The computer program product of claim 9, wherein the new product configuration and the original product configuration each comprise at least one assembly.

13. The computer program product of claim 12, wherein the first and second scores are based on a weight for each part in the at least one assembly.

14. The computer program product of claim 13, wherein the weight for each part in the at least one assembly is based on an amount of time to alter the at least one assembly.

15. The computer program product of claim 13, wherein the weight for each part in the at least one assembly is based on a cost to alter the at least one assembly.

16. The computer program product of claim 9, wherein the new product configuration comprises at least one of a logical partition, a customer specified partition, and a capacitance upgrade on demand.

17. A data processing system for managing customer order alterations in a manufacturing environment, the data processing system comprising:

a storage device, wherein the storage device stores computer usable program code; and a processor, wherein the processor executes the computer usable program code to receive a new order that comprises a new product configuration, wherein the new product configuration is a modified version of an original product configuration in an existing order;

determine whether production of the original product configuration for the existing order has started; determine a number of parts that would need to be added to a current build of the original product configuration and a number of parts that would need to be removed from the current build of the original product configuration to produce the new product configuration in response to determining that production of the original product configuration for the existing order has started; determine a first score for a first option for building the new product configuration from scratch, wherein the first score includes a weight for each part in the new product configuration to be added to build the new product configuration from scratch; determine a second score for a second option for modifying the original product configuration to satisfy the new product configuration, wherein the second score includes a weight for each part in the number of parts that would need to be added to the current build of the original product configuration and a weight for each part in the number of parts that would need to be removed from the current build of the original product configuration; determine a best option by comparing the first and second scores and selecting an option with a lower score; and present the best option to a user.

18. The data processing system of claim 17, wherein the processor further executes the computer usable program code to execute the best option.

19. The data processing system of claim 17, wherein the processor further executes the computer usable program code to determine at least a third score for at least a third option for building the new product configuration from other products in existing inventory, wherein the third score includes a weight for the other products in existing inventory needed to build the new configuration, a weight for each part that would need to be removed from the other products to build the new configuration, and a weight for each part that would need to be added to the other products to build the new configuration; and determine the best option by comparing the first, second, and third scores and selecting an option with a lower score.

20. The data processing system of claim 17, wherein the new product configuration and the original product configuration each comprise at least one assembly.

* * * * *